(12) United States Patent
Schreiber

(10) Patent No.: US 7,538,449 B2
(45) Date of Patent: May 26, 2009

(54) CIRCUITRY AND RELATED CONTROL METHOD FOR AN ELECTRIC OR HYBRID VEHICLE WITH TWO DIRECT CURRENT SOURCES

(75) Inventor: Dejan Schreiber, Nürnberg (DE)

(73) Assignee: Semikron Elektronik GmbH & Co. KG, Nuremberg (DE)

( * ) Notice: Subject to any disclaimer, the term of this patent is extended or adjusted under 35 U.S.C. 154(b) by 265 days.

(21) Appl. No.: 11/399,757

(22) Filed: Apr. 7, 2006

(65) Prior Publication Data

US 2006/0226703 A1 Oct. 12, 2006

(30) Foreign Application Priority Data

Apr. 8, 2005 (DE) .................. 10 2005 016 177

(51) Int. Cl.
*H02J 1/10* (2006.01)
(52) U.S. Cl. ........................................ 307/51
(58) Field of Classification Search ................. 307/51
See application file for complete search history.

(56) References Cited

U.S. PATENT DOCUMENTS 5,373,195 A * 12/1994 De Doncker et al. .......... 307/45
6,608,396 B2 * 8/2003 Downer et al. ............ 290/40 C
2003/0105567 A1 * 6/2003 Koenig et al. ................ 701/36

FOREIGN PATENT DOCUMENTS

DE 19849316 A1 4/1999

* cited by examiner

*Primary Examiner*—Stephen W Jackson
*Assistant Examiner*—Dru M Parries
(74) *Attorney, Agent, or Firm*—Lackenbach Siegel, LLP; Andrew F. Young

(57) ABSTRACT

Proposed is a circuitry and a related control mechanism for a vehicle with electric drive only or for a vehicle with hybrid drive comprised of an electric and a combustion motor. This circuitry has a multi-phase machine and two direct current units. Furthermore, an arrangement of power semiconductor components, in two converters in bridge arrangement of two semiconductor switches whose respective alternating current connections are connected in phase direction and to the connections of the multi-phase machine. The negative polarity connections of the two direct current units and the two converters are also connected to each other, the positive polarity connection of the first direct current unit is connected to the positive connection of the first convert by means of a flow control valve and the positive polarity connection of the second direct current unit is connected to the positive connection of the second converter by means of a flow control valve. Furthermore, a method is described for quasi-simultaneously supplying a multi-phase machine in motor operation from both direct current units and for supplying a first direct current unit from a second direct current unit with lower output voltage than the first one.

10 Claims, 3 Drawing Sheets

CIRCUITRY AND RELATED CONTROL METHOD FOR AN ELECTRIC OR HYBRID VEHICLE WITH TWO DIRECT CURRENT SOURCES

CROSS REFERENCE TO RELATED APPLICATIONS

This application claims priority from German Patent Application DE.10 2005 016 177.4, filed Apr. 8, 2005, the contents of which are incorporated herein fully by reference.

PREFERRED FIGURE FOR PUBLICATION

FIG. 2

Specification

Proposed is a circuitry and a related control mechanism for a vehicle with electric drive or for a vehicle with hybrid drive comprised of an electric and a combustion motor. Only the suitable combination of two direct current sources, at least one electric motor and the required converter technology are described. The connection of the electric motor and the combustion motor to a hybrid drive is not considered here.

German publication DE 198 49 316 A1 discloses a combination of an electric motor with a respective storage battery, i.e. a direct current source and sink with an operating voltage of 300V, for example. Furthermore such a drive system has a second storage battery with an operating voltage of 12V or 42 V. For driving with the electric motor only the first storage battery is used for energy storage purposes because the operating voltage of the second one is too low.

During operation with the electric motor, regardless of whether a combustion motor is in operation at the same time as part of a hybrid system, the electric motor is supplied from the first storage battery. To this end a converter in the form of a 3-phase inverter is arranged between the storage battery and the electric motor. During brake application the electric motor functions as a generator for charging the storage battery and the converter is operated as a rectifier. Similarly, during operation with the combustion motor, the electric motor can serve as the generator and can charge the storage battery by means of the converter since in this case the combustion motor provides the energy for the propulsion. In this case the second storage battery can be used to supply the necessary control devices.

It also is known that the first storage battery can be substituted with a fuel cell. It is operated with hydrogen and serves as energy source for the electric motor. The disadvantage is that the braking energy cannot be stored and therefore remains unused.

Further known is that a step-up controller can be arranged between the storage battery and the electric motor in order to operate an electric motor with higher nominal voltage with corresponding storage battery operating voltage.

The object of the invention is to provide a circuitry and a related control method for an electric or hybrid vehicle with at least one multi-phase machine of a first direct current unit that serves as a current source or current sink and a second direct current unit that either also serves as current source and current sink or only as a current source and in which the multi-phase machine can be supplied from any combination of direct current units, all current sinks can be supplied from the multi-phase machine and one current source alternatively or simultaneously can supply the multi-phase machine and a current sink and no additional converters, for example in the form of DC-DC transformers, between direct current units are required.

The object of the invention is attained with the measures of characteristics of claims 1 and 8. Preferred embodiments are described in the sub-claims.

The invention is based on an electric or hybrid vehicle with at least one multi-phase machine, preferably three-phase machine, that either operates based on the motor or generator, depending on the type of motion of the vehicle and the energy management of a higher-level control. This multi-phase machine is supplied from any combination of two direct current units. The first direct current unit is a current source and current sink, preferably a storage battery. The second direct current unit is a current source and current sink, preferably a storage battery or an arrangement of capacitors or only a current source, preferably a fuel cell.

The entire circuitry furthermore has an arrangement of power semiconductor components. These are comprised of two converters, preferably two three-phase converters with each in turn being comprised of a corresponding number of half-bridge arrangements of two semiconductor switches. The respective phases of the alternating current connections are connected to each other and to the connections of the multi-phase machine in direction of the phases.

The connections of two, preferably negative, polarities of the two direct current units and the two converters are connected to each other. The connection of first, preferably positive, polarity of the first direct current unit is connected to the first connection of the first converter by means of a first flow control valve while the connection of first polarity of the second direct current unit is connected to the first connection of the second converter by means of a second flow control valve.

The control method of this circuitry comprises several operating states such as:

a) Travel while using one energy source. Here, the multi-phase machine is supplied from a direct current unit by means of the corresponding converter during motor operation.

b) Acceleration when both energy sources are used. Here, the multi-phase machine during motor operation is quasi-simultaneously supplied from both direct current units. A first direct current unit actuates the motor for a certain time interval by means of an opened TOP switch of a first half-bridge arrangement and an opened BOT switch of any second half-bridge arrangement of the first converter. During the following time interval in which the free-flowing current would flow due to the inductance of the motor windings, the motor is supplied from the second direct current unit by means of an opened TOP switch of a first half-bridge arrangement and an opened BOT switch of any second half-bridge arrangement of the second converter. This method is cyclically permutated for all half-bridge arrangements.

c) Brake process with energy recovery into at least one direct current unit. Here the multi-phase machine in generator operation supplies one of the two direct current units by means of the corresponding converter in rectifier operation. Alternatively, both direct current units can be supplied in an alternating method by means of their respective converters, provided both direct current units also present current sinks.

d) Recharging process between the two direct current units. Here, a first direct current unit is supplied from a second direct current unit with lower output voltage than the first one. A TOP switch is opened that corresponds to the first converter of the first direct current unit, and simultaneously a BOT switch is opened that is connected to this TOP switch by means of a winding of the multiphase machine and corresponds to the second converter of the second direct current unit, which causes the current to flow. Then the BOT switch is closed, the current continues to flow due to the inductance of the winding and is forced to flow through the diode of the TOP switch that corresponds to the BOT switch and charges the second direct current unit while the flow control valve is open. A recharging process from the direct current unit with higher voltage to that of lower voltage is possible as well.

The inventive thought is explained in more detail based on the exemplary embodiments of FIGS. 1 through 5.

Figure 1:
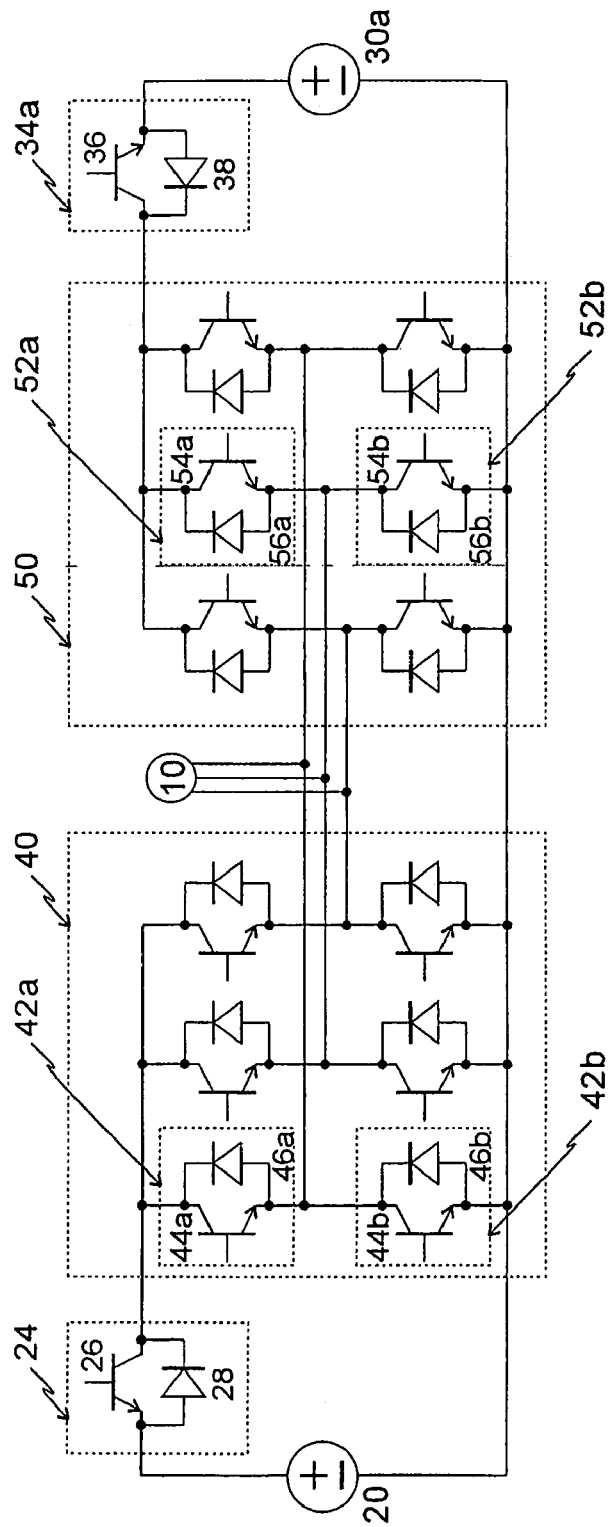
FIG. 1 shows a first symmetric circuitry according to the invention for two analogous direct current units.

FIG. 1 shows a first symmetric circuitry according to the invention for two analogous direct current units. The direct current units in this case are two analogous storage batteries (20, 30a), for example nickel metal hydride cells with an operating voltage ranging between 100V and 600V. The positive polarity connections of both storage batteries (20, 30a) are connected to identical controllable flow control valves (24, 34a). These respective converter valves (24, 34a) are in the form of a transistor (26, 36) or parallel connection of a plurality of transistors and diodes (28, 38) connected in an anti-parallel manner or a plurality of diodes. Here, the respective transistor (26, 36) is arranged with the forward direction from the respective converter (40, 50) to the respective direct current unit (20, 30a). The respective flow control valves (24, 34a) are connected to the direct current connections of the respective 3-phase converter (40, 50). The alternating current outputs of these converters (40, 50) are connected in phase direction and to the connection of a three-phase machine (10).

The converters (40, 50) in turn are an arrangement of three half-bridge arrangements of a first, the TOP switch (42a, 52a), and a second, the BOT switch (42b, 52b). [sic] The TOP switches (42a, 52a) that are connected to the positive polarity connections of the respective direct current units (20, 30a), just like the BOT switches (42b, 52b) that are connected to the negative polarity connections of the respective direct current units (20, 30a), according to the state of the art are a parallel connection of a plurality of bipolar power transistors (44a/b, 54a/b), for example IGBTs (insulated gate bipolar transistor) with a plurality of power diodes (46a/b, 56a/b) that are connected in an anti-parallel manner. For convenience reasons only one IGBT and one power diode are shown in the drawing.

During driving, when the 3-phase machine (10) in motor operation alone or simultaneously with a combustion motor actuates the vehicle, energy is taken from at least one storage battery (20, 30a). The respective current flows through the corresponding diode (28, 38) of the respective flow control valve (24, 34a) and supplies the respective converter (40, 50) that thus works as an inverter. In this type of operation the energy can be taken from one storage battery (20, 30a) for a defined period of time and can flow through the corresponding part of the circuit arrangement. Alternatively, both storage batteries (20, 30a) quasi-simultaneously can provide energy and can actuate the motor (10) via the corresponding parts of the circuitry. Another alternative is the drive of the motor (10) in the form of an alternating method of energy flow from both storage batteries (20, 30a).

During brake operation the 3-phase machine (10) works as a generator. The generated current flows through the converters (40, 50) that work as rectifiers in this case. If this output voltage of the respective converter is higher than the voltage of the corresponding storage battery (20, 30a) and if the transistor (26, 36) of the corresponding flow control valve (24, 34a) is opened, the current flows into the respective storage battery (20, 30a) and charges it. Just like above in this case it is possible, too, to charge one storage battery, both storage batteries in an alternating manner or both storage batteries at the same time, if both have the same operating voltage.

Another operating alternative is that the 3-phase machine (10) works in motor operation, is supplied from a storage battery while the other storage battery is charged. This type of operation is also possible with the circuitry according to the invention. The motor (10) in this case is supplied from the first storage accumulator (20) for example, by current flowing through the diode (28) of the flow control valve (24) and supplying the inverter (40). The above embodiment of the circuitry in accordance with the invention causes the current not to only flow into the motor (10) but also into the second converter (50). Thus the respective second storage battery (30a) can be charged according to the mechanism described above.

Figure 2:
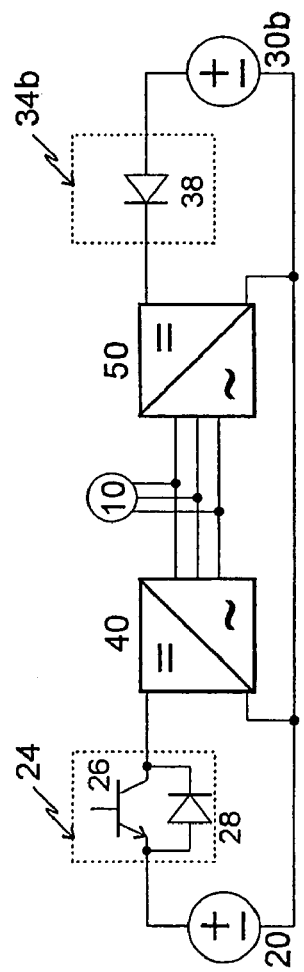
FIG. 2 shows a second circuitry according to the invention for two different direct current units.

FIG. 2 shows a second circuitry according to the invention for direct current units with two different designs. A first direct current unit (20) again is a current source and a current sink, here in the form of an arrangement of capacitors with especially high capacity, even in the form of so-called double layer capacitors. The second direct current unit (30b) on the other hand exclusively is a current source, here a fuel cell, for example. In this case both direct current units have different properties and usually different voltages. Double layer capacitors (20) have the advantageous property that they can be discharged and charged multiple times, however, their capacity in vehicles is limited due to the acceptable size and the corresponding weight. The fuel cell (30b) on the other hand has a higher energy capacity because it is supplied from an external energy storage that is also located in the vehicle. The disadvantage of using fuel cells in vehicles on the other hand is that they are not available for storing brake energy. Therefore the proposed combination of double-layer capacitors (20) and a fuel cell (30b) is an especially suitable choice for vehicles since the disadvantages of the respective direct current unit are compensated by the advantages of the respective other unit. The embodiment of the circuitry in accordance with the invention takes this into account.

This exemplary embodiment of the circuitry has the same basic components as that in FIG. 1. However, the flow control valve (34b) between fuel cell (30b) and the respective converter (50) exclusively is a diode (38) since a possible current flow to the fuel cell (30b) is not necessary for reasons that are known.

An analogous operating variation of this embodiment of the circuitry according to the invention is to charge the double-layer capacitors (20) by means of the fuel cell (30b) without actuating the motor (10). Here another unusual feature of the circuitry in accordance with the invention is especially helpful. The converter (40) that corresponds to the double-layer capacitors (20) can be operated as step-up controller in combination with the inductance of the 3-phase machine (10). If, for example, the voltage of the fuel cell (30b) is below the voltage of the double-layer capacitors (20), they still can be charged. This is accomplished by increasing the voltage value by means of the step-up controller that is formed of at least one switch (42a) of the converter (40) and at least one winding, with the necessary inductance, of the 3-phase machine. In an identical manner this function can also be used for two storage batteries with different voltages and is described in more detail for FIG. 3.

FIG. 3 shows a third circuitry in accordance with the invention for direct current units with two different designs. The basic components are identical to those in FIG. 1. For purposes of example, however, two storage batteries (20, 30a) with different operating voltage are considered here. It would also be possible to have one direct current unit as storage battery and the other as an arrangement of double-layer capacitors.

Furthermore, an additional energy supply (70) is shown. During normal drive operation it is not sufficient to charge the two storage batteries from the recovered brake energy. This means that it is inevitable to use energy supply from the public supply grid, for example, by means of a downstream rectifier. In a vehicle with hybrid drive the additional energy supply (70) alternatively can be in the form of a generator downstream from the combustion motor with a downstream rectifier.

Figure 3A:
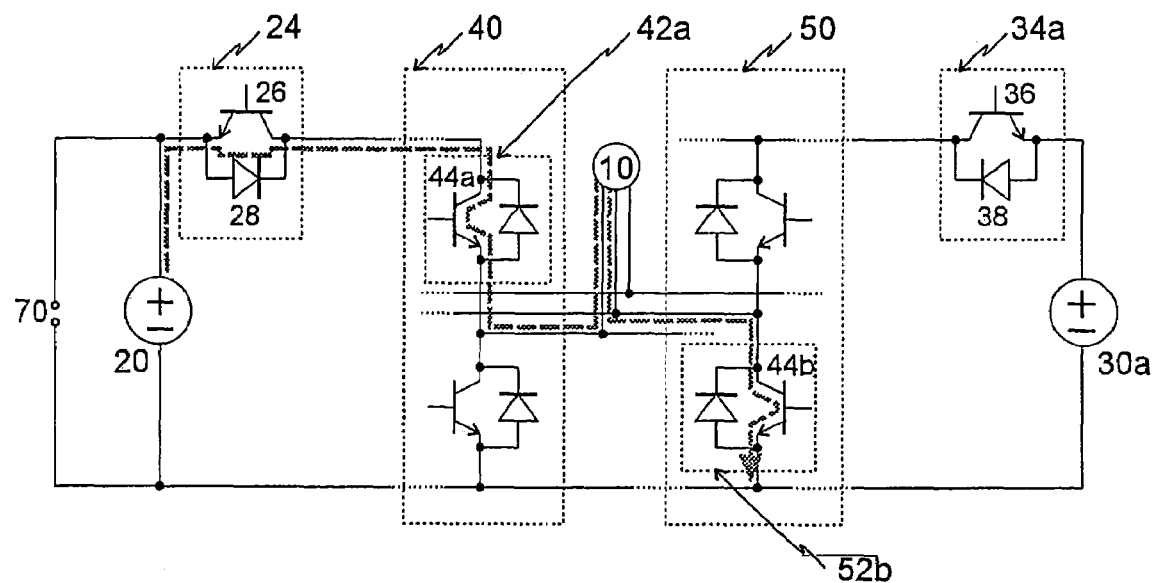
FIG. 3 shows a third circuitry according to the invention for two direct current units with different designs.
Figure 3B:
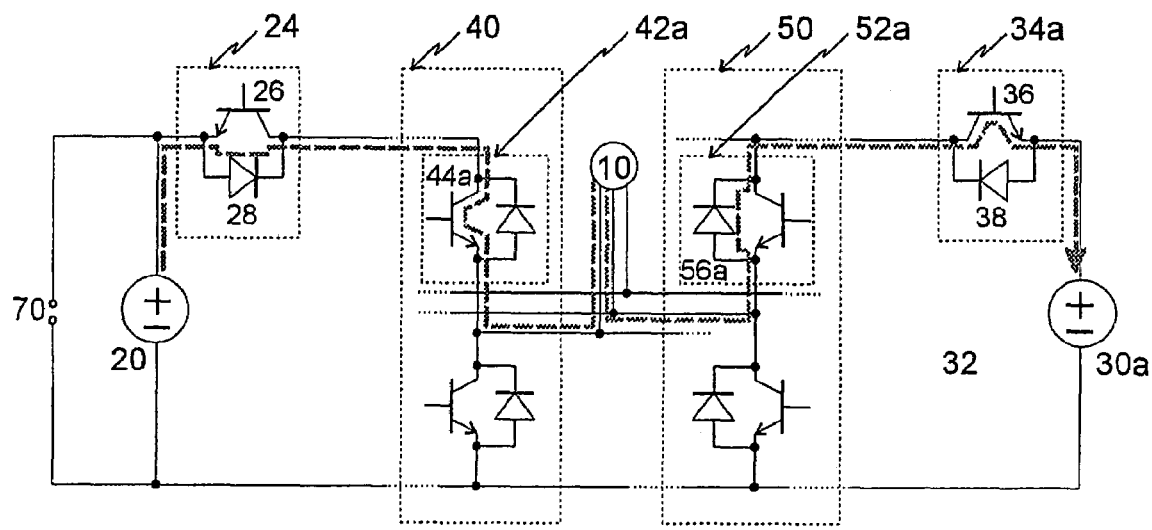

FIG. 3a/b show examples of the current flow during charging of the second storage battery (30a) from the first storage battery (20) with the first storage battery having a lower voltage than the second storage battery (30a). To this end the TOP switch (44a) of the first converter (40) and simultaneously a corresponding BOT switch (44b) is opened that is connected to this TOP switch (44a) by means of a winding of the 3-phase machine (10) and corresponds to the second converter (50) of the second direct current unit (30a) (FIG. 3a). This is the beginning of a current flow through these switches and the winding of the 3-phase machine (10). Then the BOT switch (44b) is closed in the second converter (50). The current flow is maintained due to the inductance of the winding and thus forces a current flow through the diode (56a) of TOP switch (52a) that corresponds to the BOT switch (FIG. 3b). With the flow control valve (34a) open, the current flows into the second direct current unit and charges it. For this charging process it is not necessary for the 3-phase machine to operate in the motor mode.

Figure 4:
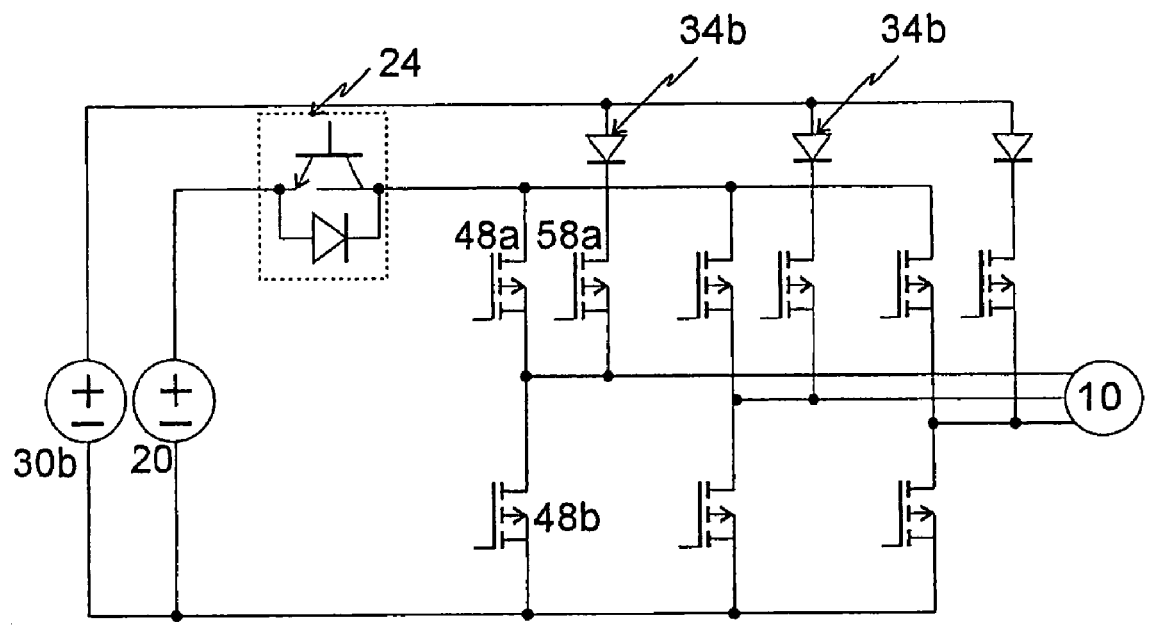
FIG. 4 shows another circuitry according to the invention with mutual BOT switches.
Figure 5:
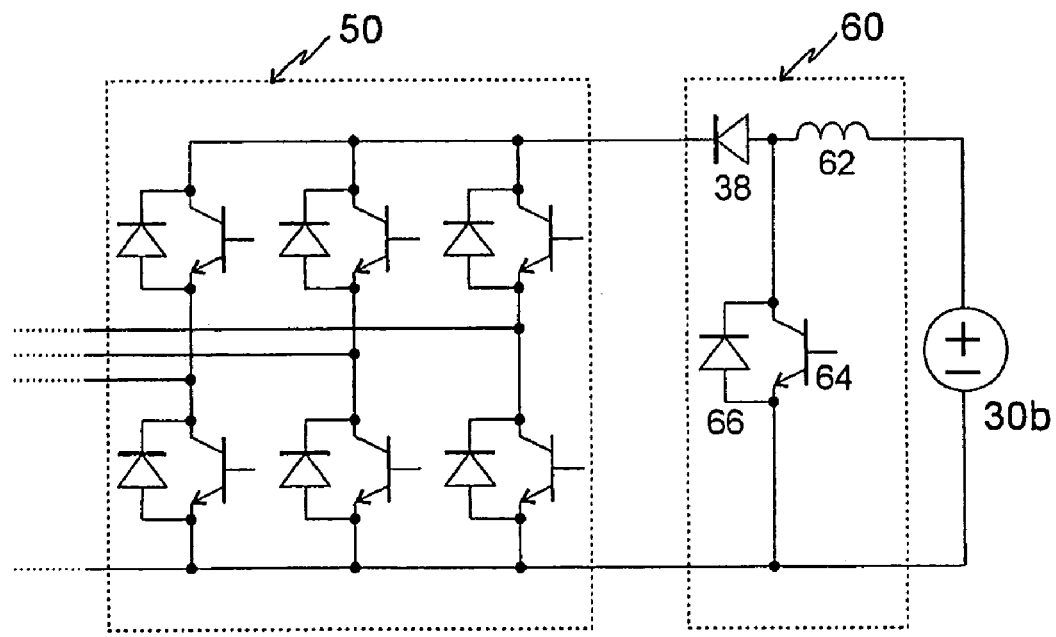
FIG. 5 shows a part of a circuitry according to the invention with an additional step-up controller.

FIG. 4 shows another circuitry according to the invention. This circuitry is especially advantageous for vehicle drives with low power 3-phase machines (10). Shown again is a direct current unit that is a storage battery (20) and a second direct current unit that is a pure power source, e.g. a fuel cell (32b) with low power output.

The storage battery (20) is connected to the corresponding converter by means of a controllable converter valve (24) as described above. The fuel cell (30b) is connected to the corresponding converter by means of three non-controllable flow control valves (34b) of each phase.

In this embodiment the two converters are not independent units but rather they are connected. The BOT (48b) and TOP (48a, 58a) switches are unipolar power transistors such as MOS-FETs, for example. Each converter has its own TOP switch per phase. However, the converters are connected in a manner that ensures that there is only one mutual BOT switch (48b) per phase for each phase. The functionality described above is fully maintained with this embodiment of the circuitry in accordance with the invention. The circuitry has a decisive advantage in that it has a small number of power switches.

FIG. 2 shows a part of a circuitry in accordance with the invention with an additional step-up controller (60). The basic circuitry corresponds to the one shown in FIG. 3. However, it does include the step-up controller (60) that is arranged between the current source (30b), for example in a fuel cell, and the corresponding converter (50). This step-up controller (60) comprises an inductance (62) between the positive polarity connection of the current source (30b) and the non-controllable flow control valve, the diode (38), as well as a power switch (64) with anti-parallel diode (66) between the negative polarity connection of the current source (30b) and the center between inductance (62) and flow control valve (38).

The advantage with this embodiment of the circuitry is the fact that it is possible to effectively connect a current source (30b) with low operating voltage to the motor (10) since the voltage value can be increased accordingly by means of the step-up controller (60).

What is claimed is:

1. A circuit for at least one of an electric vehicle and a hybrid vehicle, comprising:
   at least one multi-phase machine with a first direct current unit that is at least one of a current source and a current sink;
   a second direct current unit that is at least one of a current source and a sink;
   an arrangement of power semiconductor components in a first and a second converter;
   each said first and said second converter further comprising:
      a corresponding number of half-bridge arrangements of two semiconductor switches;
      respective alternating current connections of each said semiconductor switches being connected to each other in phase direction and to connections of said at least one multi-phase machines whose direct current connections with a same polarity of respective converters are connected; wherein:
      a second polarity connection of each of said first and said second direct current units connects with each respective said converter;
      at least one flow control valve means for connecting a first polarity connection of said first direct current unit to a first connection of said first converter;
      at least a second flow control valve means for connecting a first polarity connection of said second direct current unit to a first connection of said second converter;
      said semiconductor switches, further comprise:
         at least one respective BOT switch, and;
      said switches of said negative connection and three half-bridge arrangements in said circuit, are mutual switches of said first and said second converter.

2. A circuit, according to claim 1, wherein:
   each of said two semiconductor switches further comprising:
      a plurality of bipolar power transistors; and
      at least one of a plurality of anti-parallel power diodes and a plurality of parallel unipolar power transistors.

3. A circuit, according to claim 2, wherein:
   at least one of said bipolar power transistors is art IGB transistor (IGBT).

4. A circuit according to claim 2, wherein;
   at least one of said plurality of anti-parallel power diodes and said plurality of parallel unipolar power transistors is a MOS-FET.

5. A circuit according to claim 1, wherein:
each said first and said second direct current units are storage batteries with operating voltages of between 11V and 600V.

6. A circuit according to claim 1, wherein:
each said first and said second flow control valve meats is a parallel connection of a semiconductor switch with forward direction from respective said corresponding converter arranged respective to said corresponding direct current unit with a diode and with forward direction from said corresponding direct current unit to said corresponding converter.

7. A circuit, according to claim 1, wherein:
said first direct current unit is at least one of a storage battery with an operating voltage of between 100V and 600V and an arrangement of capacitors with high capacity;
said second direct current unit is a fuel cell;
said first flow control valve means for connecting being controllable and in a parallel connection with a semiconductor switch arranged with a forward direction from said corresponding converter to said corresponding direct current unit and with a diode with forward direction from said corresponding direct current unit arranged to said corresponding converter; and
second flow control valve means for connecting being non-controllable and functioning as a diode arranged with a forward direction from said corresponding direct current unit to the corresponding converter.

8. A circuit, according to claim 1, further comprising:
a step-up controller arranged between at least one of said direct current unit and said respective corresponding converter.

9. A circuit, according to claim 1, wherein:
a third direct current connection for energy supply is arranged with said current unit that is supplied by at least one of a generator coupled to a combustion motor and a connection to an external public grid by means of a downstream rectification.

10. A method for controlling a circuitry system, comprising the steps of:
providing a circuit for at least one of an electric vehicle and a hybrid vehicle, further comprising:
at least one multi-phase machine with a first direct current unit that is at least one of a current source and a current sink;
a second direct current unit that is at least one of a current source and a sink;
an arrangement of power semiconductor components in a first and a second converter;
each said first and said second converter further comprising:
a corresponding number of half-bridge arrangements of two semiconductor switches;
respective alternating current connections of each said semiconductor switches being connected to each other in phase direction and to connections of said at least one multi-phase machines whose direct current connections with a same polarity of respective converters are connected; wherein:
a second polarity connection of each of said first and said second direct current units connects with each respective said converter and each said converter is connected;
at least one flow control valve means for connecting a first polarity connection of said first direct current unit to a first connection of said first converter;
at least a second flow control valve means for connecting a first polarity connection of said second direct current unit to a first connection of said second converter;
supplying a multi-phase machine in motor operation quasi-simultaneously from both said direct current units; wherein
said first direct current unit actuates said motor for a certain time interval by means of an opened TOP switch of a first half-bridge arrangement and an opened BOT switch of at least a second half-bridge arrangement of said first converter, during the subsequent time interval during which the free-flowing current would flow due to the inductance of the motor windings;
a TOP switch of a first half-bridge arrangement and a BOT switch of any second half-bridge arrangement of the second converter would supply the motor from the second direct current unit, whereby said supplying step enables said method permutated cyclically for all said half-bridge arrangements; and
said first direct current unit is supplied from said second direct current unit with lower output voltage in that said TOP switch that corresponds to the first converter of said first direct current unit and simultaneously a BOT switch is opened that connects to said TOP switch by means of a winding of said multi-phase machine; and corresponds to the second converter of the second direct current unit, which causes current to flow, with the BOT switch in a closed operation and the current flow being maintained due to the inductance of the winding and forced to flow through a diode of said TOP switch that corresponds to said BOT switch and charging said second direct unit with an open flow control valve.

* * * * *